(12) United States Patent
Cismas

(10) Patent No.: US 9,848,188 B1
(45) Date of Patent: Dec. 19, 2017

(54) VIDEO CODING TRANSFORM SYSTEMS AND METHODS

(71) Applicant: OVICS, Saratoga, CA (US)

(72) Inventor: Sorin C. Cismas, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 544 days.

(21) Appl. No.: 14/303,554

(22) Filed: Jun. 12, 2014

Related U.S. Application Data

(60) Provisional application No. 61/834,037, filed on Jun. 12, 2013.

(51) Int. Cl.
  *H04N 7/26* (2006.01)
  *H04N 19/60* (2014.01)
  *H04N 19/176* (2014.01)

(52) U.S. Cl.
  CPC . *H04N 19/00775* (2013.01); *H04N 19/00278* (2013.01)

(58) Field of Classification Search
  CPC ................. H04N 19/625; H04N 19/60; H04N 19/00072; H04N 19/00296
  See application file for complete search history.

(56) References Cited

U.S. PATENT DOCUMENTS

| | | | |
|---|---|---|---|
| 5,748,514 A | 5/1998 | Okada et al. | |
| 5,943,502 A | 8/1999 | Sariel et al. | |
| 7,139,436 B2 | 11/2006 | Tomita et al. | |
| 2005/0281332 A1 | 12/2005 | Lai et al. | |
| 2007/0106720 A1 | 5/2007 | Pisek et al. | |
| 2012/0177108 A1* | 7/2012 | Joshi ..................... | G06F 17/147 375/240.03 |
| 2013/0003856 A1* | 1/2013 | Saxena ................ | H04N 19/159 375/240.18 |
| 2013/0022128 A1* | 1/2013 | Symes .................. | G06F 17/147 375/240.18 |

OTHER PUBLICATIONS

Chakrabarti et al., "Architectures for Wavelet Transforms: A Survey," Journal of VLSI signal processing systems signal, image and video technology, vol. 14, Issue 2, pp. 171-192, Nov. 1996.

* cited by examiner

*Primary Examiner* — Zhubing Ren
(74) *Attorney, Agent, or Firm* — Meyertons, Hood, Kivlin, Kowert & Goetzel, P.C.

(57) ABSTRACT

In some embodiments, a HEVC (High Efficiency Video Coding, MPEG-H Part 2, H.265) video coder (encoder/decoder) transform unit includes nested transform stages, with 8×8 transform computation hardware, e.g. fused quad multiply accumulate (MAC) units and adders, forming part of 16×16 transform computation hardware, which in turn forms part of a 32×32 video transform computation unit. Control logic and multiplexers may be used to reconfigure interconnections between MAC units depending on the size of incoming video blocks. The transform of a 32×32 video block is computed in a fixed number of clock cycles that is independent of whether or how the 32×32 block is partitioned in smaller blocks. A redundant binary format is used until the final stage of operations to increase the speed of computation.

14 Claims, 17 Drawing Sheets

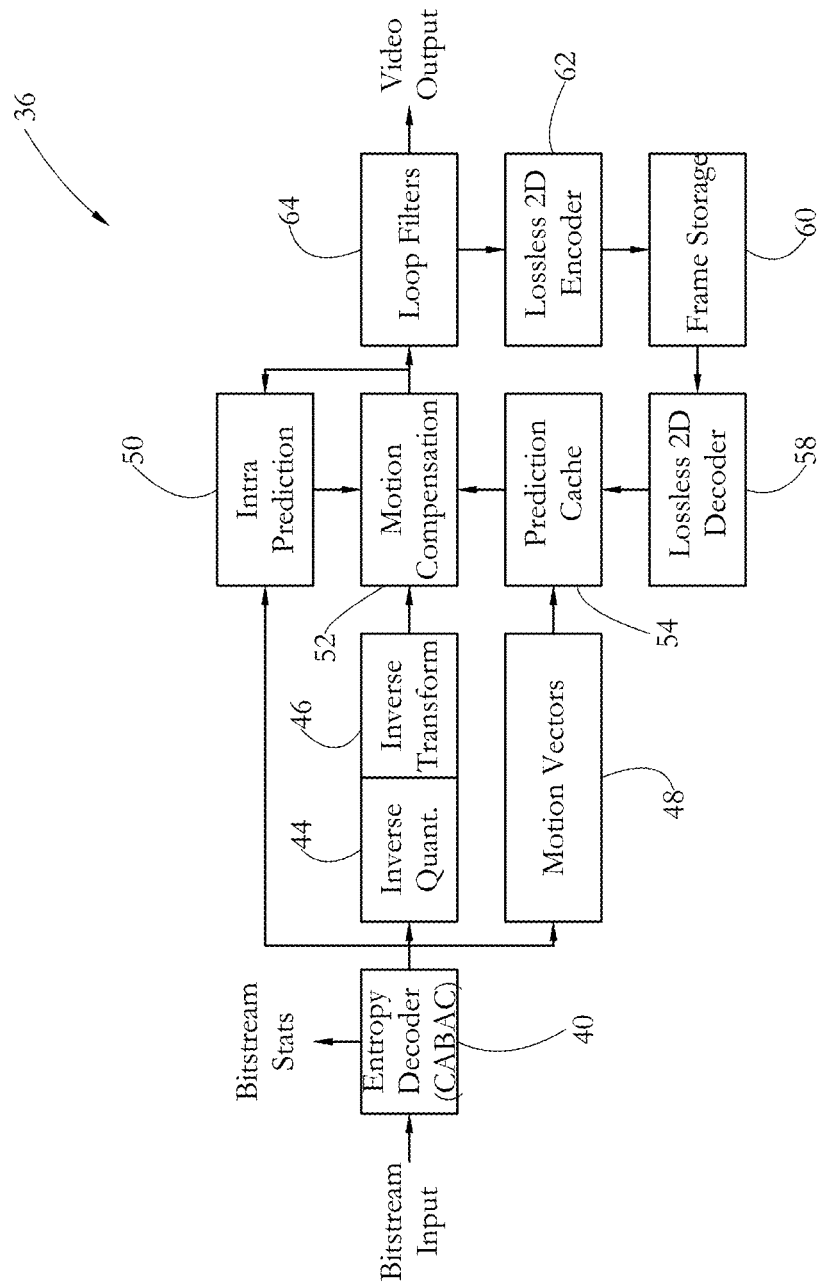
FIG. 2-A

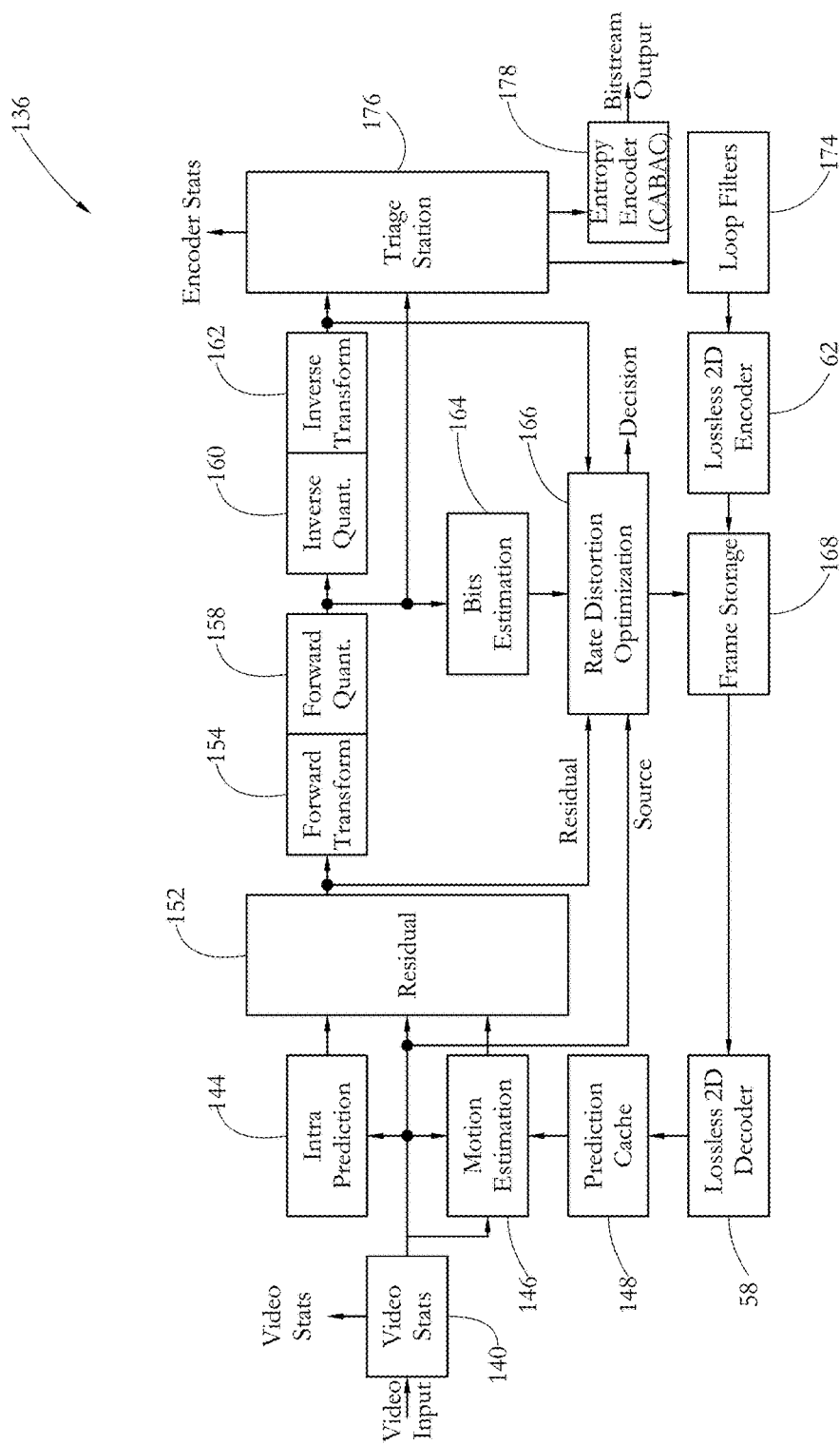
FIG. 2-B

FIG. 4

```
transform {
// begin 32 point transform
o0 = c10*s1+c30*s3+c50*s5+c70*s7+c90*s9+cb0*sb+cd0*sd+cf0*sf+ch0*sh+cj0*sj+cl0*sl+cn0*sn+cp0*sp+cr0*sr+ct0*st+cv0*sv;
of = c1f*s1+c3f*s3+c5f*s5+c7f*s7+c9f*s9+cbf*sb+cdf*sd+cff*sf+chf*sh+cjf*sj+clf*sl+cnf*sn+cpf*sp+crf*sr+ctf*st+cvf*sv;
o7 = c17*s1+c37*s3+c57*s5+c77*s7+c97*s9+cb7*sb+cd7*sd+cf7*sf+ch7*sh+cj7*sj+cl7*sl+cn7*sn+cp7*sp+cr7*sr+ct7*st+cv7*sv;
o8 = c18*s1+c38*s3+c58*s5+c78*s7+c98*s9+cb8*sb+cd8*sd+cf8*sf+ch8*sh+cj8*sj+cl8*sl+cn8*sn+cp8*sp+cr8*sr+ct8*st+cv8*sv;
o3 = c13*s1+c33*s3+c53*s5+c73*s7+c93*s9+cb3*sb+cd3*sd+cf3*sf+ch3*sh+cj3*sj+cl3*sl+cn3*sn+cp3*sp+cr3*sr+ct3*st+cv3*sv;
oc = c1c*s1+c3c*s3+c5c*s5+c7c*s7+c9c*s9+cbc*sb+cdc*sd+cfc*sf+chc*sh+cjc*sj+clc*sl+cnc*sn+cpc*sp+crc*sr+ctc*st+cvc*sv;
o4 = c14*s1+c34*s3+c54*s5+c74*s7+c94*s9+cb4*sb+cd4*sd+cf4*sf+ch4*sh+cj4*sj+cl4*sl+cn4*sn+cp4*sp+cr4*sr+ct4*st+cv4*sv;
ob = c1b*s1+c3b*s3+c5b*s5+c7b*s7+c9b*s9+cbb*sb+cdb*sd+cfb*sf+chb*sh+cjb*sj+clb*sl+cnb*sn+cpb*sp+crb*sr+ctb*st+cvb*sv;
o1 = c11*s1+c31*s3+c51*s5+c71*s7+c91*s9+cb1*sb+cd1*sd+cf1*sf+ch1*sh+cj1*sj+cl1*sl+cn1*sn+cp1*sp+cr1*sr+ct1*st+cv1*sv;
oe = c1e*s1+c3e*s3+c5e*s5+c7e*s7+c9e*s9+cbe*sb+cde*sd+cfe*sf+che*sh+cje*sj+cle*sl+cne*sn+cpe*sp+cre*sr+cte*st+cve*sv;
o6 = c16*s1+c36*s3+c56*s5+c76*s7+c96*s9+cb6*sb+cd6*sd+cf6*sf+ch6*sh+cj6*sj+cl6*sl+cn6*sn+cp6*sp+cr6*sr+ct6*st+cv6*sv;
o9 = c19*s1+c39*s3+c59*s5+c79*s7+c99*s9+cb9*sb+cd9*sd+cf9*sf+ch9*sh+cj9*sj+cl9*sl+cn9*sn+cp9*sp+cr9*sr+ct9*st+cv9*sv;
o2 = c12*s1+c32*s3+c52*s5+c72*s7+c92*s9+cb2*sb+cd2*sd+cf2*sf+ch2*sh+cj2*sj+cl2*sl+cn2*sn+cp2*sp+cr2*sr+ct2*st+cv2*sv;
od = c1d*s1+c3d*s3+c5d*s5+c7d*s7+c9d*s9+cbd*sb+cdd*sd+cfd*sf+chd*sh+cjd*sj+cld*sl+cnd*sn+cpd*sp+crd*sr+ctd*st+cvd*sv;
o5 = c15*s1+c35*s3+c55*s5+c75*s7+c95*s9+cb5*sb+cd5*sd+cf5*sf+ch5*sh+cj5*sj+cl5*sl+cn5*sn+cp5*sp+cr5*sr+ct5*st+cv5*sv;
oa = c1a*s1+c3a*s3+c5a*s5+c7a*s7+c9a*s9+cba*sb+cda*sd+cfa*sf+cha*sh+cja*sj+cla*sl+cna*sn+cpa*sp+cra*sr+cta*st+cva*sv;
// begin 16 point transform
eo0 = c20*s2+c60*s6+ca0*sa+ce0*se+ci0*si+cm0*sm+cq0*sq+cu0*su;
eo7 = c27*s2+c67*s6+ca7*sa+ce7*se+ci7*si+cm7*sm+cq7*sq+cu7*su;
eo3 = c23*s2+c63*s6+ca3*sa+ce3*se+ci3*si+cm3*sm+cq3*sq+cu3*su;
eo4 = c24*s2+c64*s6+ca4*sa+ce4*se+ci4*si+cm4*sm+cq4*sq+cu4*su;
eo1 = c21*s2+c61*s6+ca1*sa+ce1*se+ci1*si+cm1*sm+cq1*sq+cu1*su;
eo6 = c26*s2+c66*s6+ca6*sa+ce6*se+ci6*si+cm6*sm+cq6*sq+cu6*su;
eo2 = c22*s2+c62*s6+ca2*sa+ce2*se+ci2*si+cm2*sm+cq2*sq+cu2*su;
eo5 = c25*s2+c65*s6+ca5*sa+ce5*se+ci5*si+cm5*sm+cq5*sq+cu5*su;
```

FIG. 5-A

```
// begin  8 point transform
  eeo0 = c40*s4+cc0*sc+ck0*sk+cs0*ss;
  eeo3 = c43*s4+cc3*sc+ck3*sk+cs3*ss;
  eeo1 = c41*s4+cc1*sc+ck1*sk+cs1*ss;
  eeo2 = c42*s4+cc2*sc+ck2*sk+cs2*ss;
// begin  4 point transform
  eeee0= c00*s0+cg0*sg;
  eeeo0= c80*s8+co0*so;
  eeee1= c01*s0+cg1*sg;
  eeeo1= c81*s8+co1*so;
  eee0 = eeee0 + eeeo0;
  eee3 = eeee0 - eeeo0;
  eee1 = eeee1 + eeeo1;
  eee2 = eeee1 - eeeo1;
// end    4 point transform
  ee0  = eee0 + eeo0;
  ee7  = eee0 - eeo0;
  ee3  = eee3 + eeo3;
  ee4  = eee3 - eeo3;
  ee1  = eee1 + eeo1;
  ee6  = eee1 - eeo1;
  ee2  = eee2 + eeo2;
  ee5  = eee2 - eeo2;
// end    8 point transform
  e0  = ee0 + eo0;
  ef  = ee0 - eo0;
  e7  = ee7 + eo7;
  e8  = ee7 - eo7;
  e3  = ee3 + eo3;
  ec  = ee3 - eo3;
  e4  = ee4 + eo4;
  eb  = ee4 - eo4;
  e1  = ee1 + eo1;
  ee  = ee1 - eo1;
  e6  = ee6 + eo6;
  e9  = ee6 - eo6;
  e2  = ee2 + eo2;
  ed  = ee2 - eo2;
  e5  = ee5 + eo5;
  ea  = ee5 - eo5;
// end   16 point transform
```

300

```
  d0  = e0  + o0;
  dv  = e0  - o0;
  df  = ef  + of;
  dg  = ef  - of;
  d7  = e7  + o7;
  do  = e7  - o7;
  d8  = e8  + o8;
  dn  = e8  - o8;
  d3  = e3  + o3;
  ds  = e3  - o3;
  dc  = ec  + oc;
  dj  = ec  - oc;
  d4  = e4  + o4;
  dr  = e4  - o4;
  db  = eb  + ob;
  dk  = eb  - ob;
  d1  = e1  + o1;
  du  = e1  - o1;
  de  = ee  + oe;
  dh  = ee  - oe;
  d6  = e6  + o6;
  dp  = e6  - o6;
  d9  = e9  + o9;
  dm  = e9  - o9;
  d2  = e2  + o2;
  dt  = e2  - o2;
  dd  = ed  + od;
  di  = ed  - od;
  d5  = e5  + o5;
  dq  = e5  - o5;
  da  = ea  + oa;
  dl  = ea  - oa;
// end   32 point transform}
```

```
mac4 (c0, c1, c2, c3, s0, s1, s2, s3, ma0,ma1)        // 11 units
{
  {a0 +a1 } = c0 * s0 + c1 * s1;
  {a2 +a3 } = c2 * s2 + c3 * s3;
  {ma0+ma1} = a0 + a1 + a2 + a3;
} mac4x (c0, c1, c2, c3, s0, s1, s2, s3, ma0,ma1, ms0,ms1) // 1 unit
{
  {a0 +a1 } = c0 * s0 + c1 * s1;
  {a2 +a3 } = c2 * s2 + c3 * s3;
  {ma0+ma1} = a0 + a1 + a2 + a3;
  {ms0+ms1} = a0 + a1 - a2 - a3;
} add2 (e0, e1, o0, o1, a0, a1)                         // 11 units
{
  {a0+a1} = e0 + e1 + o0 + o1;
} sub2 (e0, e1, o0, o1, s0, s1)                         // 4 units
{
  {s0+s1} = e0 + e1 - o0 - o1;
} add (d0, d1, d)                                        // 4 units
{
  d = d0 + d1;
}
```

FIG. 6

```
// {ma00+ma01}   o00   o70   o30   o40   o10   o60   o20   o50
// {ma10+ma11}   o01   o71   o31   o41   o11   o61   o21   o51
// {ma20+ma21}   o02   o72   o32   o42   o12   o62   o22   o52
// {ma30+ma31}   o03   o73   o33   o43   o13   o63   o23   o53
// {ma40+ma41}   of0   o80   oc0   ob0   oe0   o90   od0   oa0
// {ma50+ma51}   of1   o81   oc1   ob1   oe1   o91   od1   oa1
// {ma60+ma61}   of2   o82   oc2   ob2   oe2   o92   od2   oa2
// {ma70+ma71}   of3   o83   oc3   ob3   oe3   o93   od3   oa3
// {ma80+ma81}   eo00  eo70  eo30  eo40  eo10  eo60  eo20  eo50
// {ma90+ma91}   eo01  eo71  eo31  eo41  eo11  eo61  eo21  eo51
// {maa0+maa1}   eeo0        eeo3        eeo1        eeo2
// {mab0+mab1}   eee0        eee3        eee1        eee2 mac4  mac40 (c01, c03, c05, c07, s1, s3, s5, s7, o000, o001          ); // 32
    mac4  mac41 (c09, c0b, c0d, c0f, s9, sb, sd, sf, o010, o011          ); // 32
    mac4  mac42 (c0h, c0j, c0l, c0n, sh, sj, sl, sn, o020, o021          ); // 32
    mac4  mac43 (c0p, c0r, c0t, c0v, sp, sr, st, sv, o030, o031          ); // 32
    mac4  mac44 (c11, c13, c15, c17, s1, s3, s5, s7, o100, o101          ); // 32
    mac4  mac45 (c19, c1b, c1d, c1f, s9, sb, sd, sf, o110, o111          ); // 32
    mac4  mac46 (c1h, c1j, c1l, c1n, sh, sj, sl, sn, o120, o121          ); // 32 16
    mac4  mac47 (c1p, c1r, c1t, c1v, sp, sr, st, sv, o130, o131          ); // 32 16
    mac4  mac48 (c02, c06, c0a, c0e, s2, s6, sa, se, eo00, eo01          ); // 32 16  4
    mac4  mac49 (c0i, c0m, c0q, c0u, si, sm, sq, su, eo10, eo11          ); // 32 16 8 4
    mac4  mac4a (c04, c0c, c0k, c0s, s4, sc, sk, ss, eeo00, eeo01        ); // 32 16 8 4
    mac4x mac4b (c00, c0g, c08, c0o, s0, sg, s8, so, eee00, eee01, eee10, eee11); // 32 16 8 4
```

FIG. 7-A

```
// {r100+r101}      o00  o70  o30  o40  o10  o60  o20  o50
// {r110+r111}      o01  o71  o31  o41  o11  o61  o21  o51
// {r120+r121}      o02  o72  o32  o42  o12  o62  o22  o52
// {r130+r131}      o03  o73  o33  o43  o13  o63  o23  o53
// {r140+r141}      of0  o80  oc0  ob0  oe0  o90  od0  oa0
// {r150+r151}      of1  o81  oc1  ob1  oe1  o91  od1  oa1
// {r160+r161}      of2  o82  oc2  ob2  oe2  o92  od2  oa2
// {r170+r171}      of3  o83  oc3  ob3  oe3  o93  od3  oa3
// {r180+r181}      eo00 eo70 eo30 eo40 eo10 eo60 eo20 eo50
// {r190+r191}      eo01 eo71 eo31 eo41 eo11 eo61 eo21 eo51
// {r1a0+r1a1}      eee0  .   eeo3  .   eeo1  .   eeo2  .
// {r1b0+r1b1}      eee0  .   eee3  .   eee1  .   eee2  .

add2 add20 (r1b0, r1b1, r1a0, r1a1, ee00, ee01); // 32 16 8 add2 add22 (r180, r181, r190, r191, s180, s181); // 32 16 8
  add2 add23 (ee00, ee01, s180, s181, e00, e01); // 32 16 8
  sub2 sub24 (ee00, ee01, s180, s181, e10, e11); // 32 16 8 add2 add25 (r100, r101, r110, r111, s100, s101); // 32
  add2 add26 (r120, r121, r130, r131, s120, s121); // 32
  add2 add27 (s100, s101, s120, s121, t100, t101); // 32
  add2 add28 ( e00,  e01, t100, t101, d00, d01); // 32
  sub2 sub29 ( e00,  e01, t100, t101, d10, d11); // 32 add2 add2a (r140, r141, r150, r151, s140, s141); // 32
  add2 add2b (r160, r161, r170, r171, s160, s161); // 32 16
  add2 add2c (s140, s141, s160, s161, t140, t141); // 32 16
  add2 add2d ( e10,  e11, t140, t141, d20, d21); // 32 16
  sub2 sub2e ( e10,  e11, t140, t141, d30, d31); // 32 16

// {r200,r201}      d0x  d7x  d3x  d4x  d1x  d6x  d2x  d5x
// {r210,r211}      dvx  dox  dsx  drx  dux  dpx  dtx  dqx
// {r220,r221}      dfx  d8x  dcx  dbx  dex  d9x  ddx  dax
// {r230,r231}      dgx  dnx  djx  dkx  dhx  dmx  dix  dlx add (r200, r201, d0);
  add (r210, r211, d1);
  add (r220, r221, d2);
  add (r230, r231, d3);

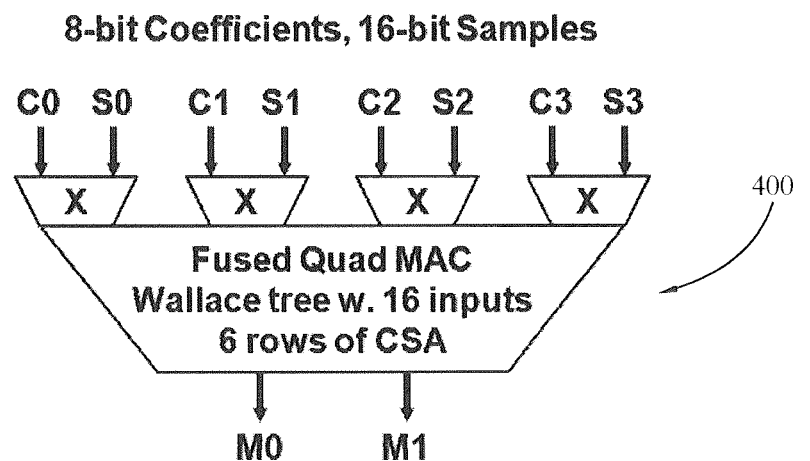
FIG. 8-A
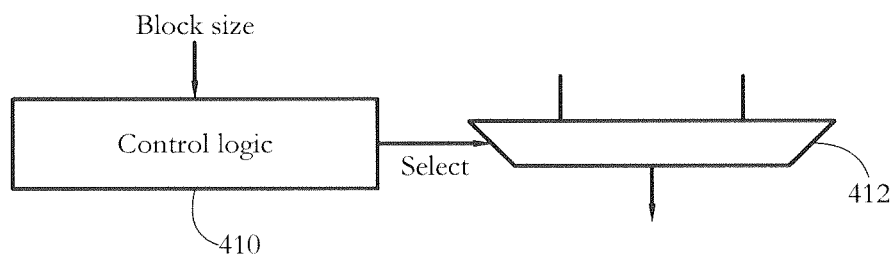
FIG. 8-B

```
// {ma60+ma61}   eo70 eo40 eo60 eo50
// {ma70+ma71}   eo71 eo41 eo61 eo51
// {ma80+ma81}   eo00 eo30 eo10 eo20
// {ma90+ma91}   eo01 eo31 eo11 eo21
// {maa0+maa1}   eeo0 eeo3 eeo1 eeo2
// {mab0+mab1}   eee0 eee3 eee1 eee2 mac4  mac46 (c1h, c1j, c1l, c1n, sh, sj, sl, sn, o120, o121                );// 32 16
  mac4  mac47 (c1p, c1r, c1t, c1v, sp, sr, st, sv, o130, o131                );// 32 16
  mac4  mac48 (c02, c06, c0a, c0e, s2, s6, sa, se, eo00, eo01                );// 32 16 4
  mac4  mac49 (c0i, c0m, c0q, c0u, si, sm, sq, su, eo10, eo11                );// 32 16 8 4
  mac4  mac4a (c04, c0c, c0k, c0s, s4, sc, sk, ss, eeo00, eeo01              );// 32 16 8 4
  mac4x mac4b (c00, c0g, c08, c0o, s0, sg, s8, so, eee00, eee01, eee10, eee11);// 32 16 8 4

// {r160+r161}      eo70 eo40 eo60 eo50
// {r170+r171}      eo71 eo41 eo61 eo51
// {r180+r181}      eo00 eo30 eo10 eo20
// {r190+r191}      eo01 eo31 eo11 eo21
// {r1a0+r1a1}      eeo0 eeo3 eeo1 eeo2
// {r1b0+r1b1}      eee0 eee3 eee1 eee2 add2 add20 (r1b0, r1b1, r1a0, r1a1, ee00, ee01);// 32 16 8
  sub2 sub21 (r1b0, r1b1, r1a0, r1a1, ee10, ee11);// 32 16 8 add2 add22 (r180, r181, r190, r191, s180, s181);// 32 16 8
  add2 add23 (ee00, ee01, s180, s181, e00, e01);// 32 16 8
  sub2 sub24 (ee00, ee01, s180, s181, e10, e11);// 32 16 8 add2 add2b (r160, r161, r170, r171, s160, s161);// 32 16
  add2 add2c (  0,    0, s160, s161, t140, t141);// 32 16
  add2 add2d (ee10, ee11, t140, t141, d20, d21);// 32 16
  sub2 sub2e (ee10, ee11, t140, t141, d30, d31);// 32 16

// {r200,r201}       d0x  d3x  d1x  d2x
// {r210,r211}       dfx  dcx  dex  ddx
// {r220,r221}       d7x  d4x  d6x  d5x
// {r230,r231}       d8x  dbx  d9x  dax add (r200, r201, d0);
  add (r210, r211, d1);
  add (r220, r221, d2);
  add (r230, r231, d3);

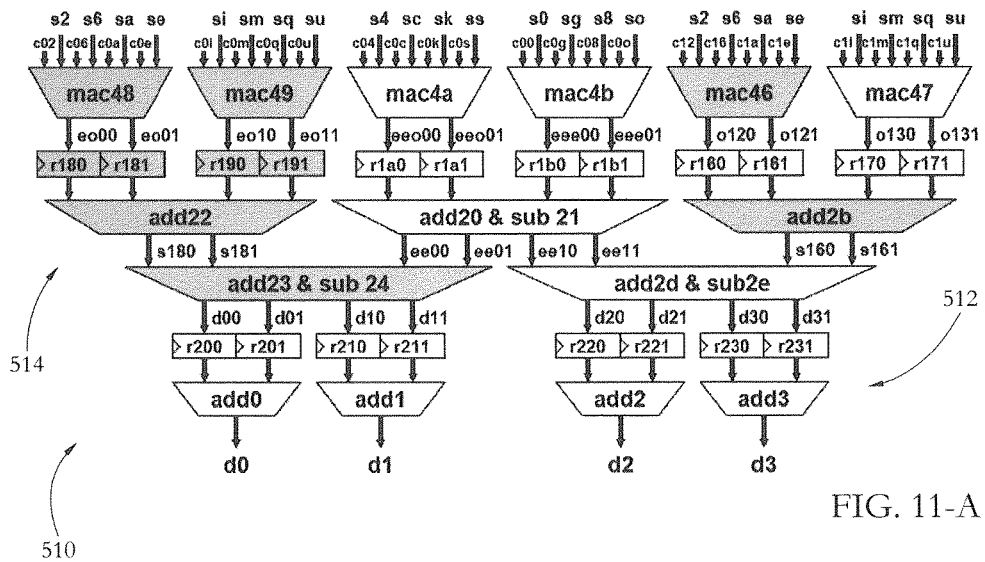
FIG. 11-A
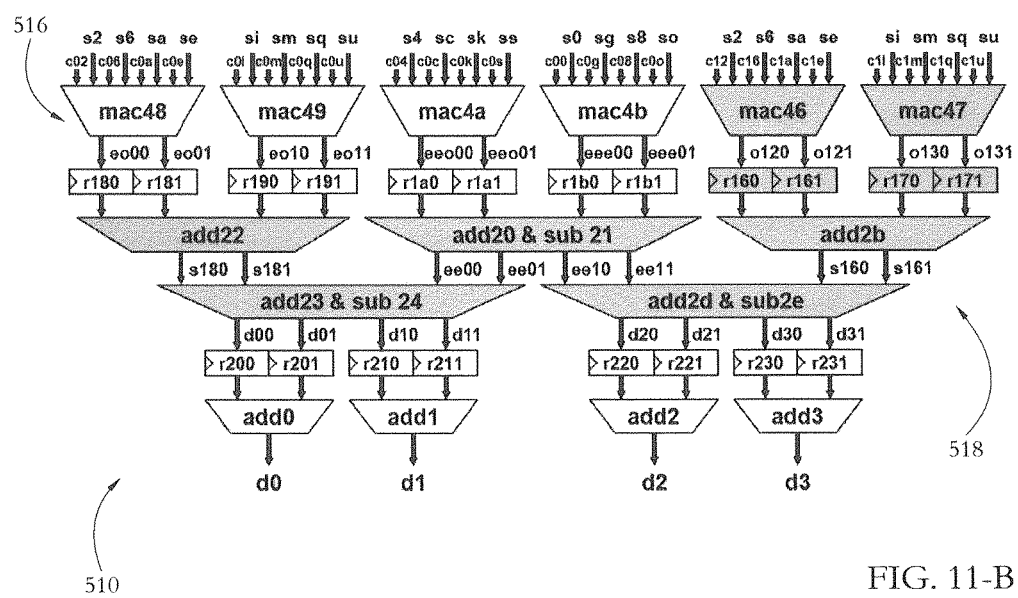
FIG. 11-B

```
// {ma90+ma91}    eeo3 eeo2
// {maa0+maa1}    eeo0 eeo1
// {mab0+mab1}    eee03 eee12
  mac4  mac49 (c0i, c0m, c0q, c0u, si, sm, sq, su, eo10, eo11           ); // 32 16 8 4
  mac4  mac4a (c04, c0c, c0k, c0s, s4, sc, sk, ss, eeo00, eeo01         ); // 32 16 8 4
  mac4x mac4b (c00, c0g, c08, c0o, s0, sg, s8, so, eee00, eee01, eee10, eee11); // 32 16 8 4
// {r190+r191}    eeo3 eeo2
// {r1a0+r1a1}    eeo0 eeo1
// {r1b0+r1b1}    eee03 eee12
  add2 add20 (r1b0, r1b1, r1a0, r1a1, ee00, ee01); // 32 16 8
  sub2 sub21 (r1b0, r1b1, r1a0, r1a1, ee10, ee11); // 32 16 8 add2 add22 (  0,   0, r190, r191, s180, s181); // 32 16 8
  add2 add23 (r180, r181, s180, s181, e00, e01); // 32 16 8
  sub2 sub24 (r180, r181, s180, s181, e10, e11); // 32 16 8
// {r200,r201}         d0x   d1x
// {r210,r211}         d7x   d6x
// {r220,r221}         d3x   d2x
// {r230,r231}         d4x   d5x
  add (r200, r201, d0);
  add (r210, r211, d1);
  add (r220, r221, d2);
  add (r230, r231, d3);
// d0              d0    d1
// d1              d7    d6
// d2              d3    d2
// d3              d4    d5
```

FIG. 12

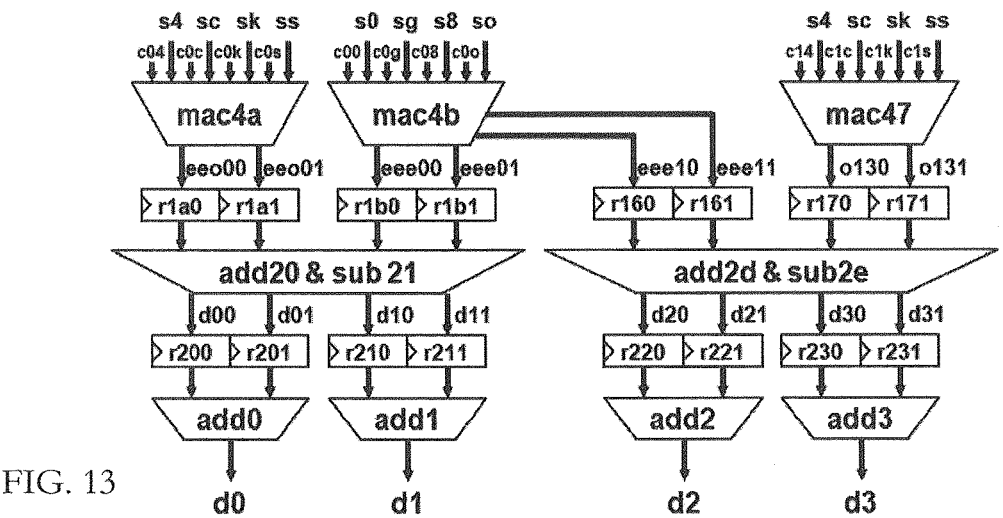

FIG. 13

```
// {ma80+ma81}   a0
// {ma90+ma91}   a1
// {maa0+maa1}   a2
// {mab0+mab1}   a3 mac4  mac48 (c02, c06, c0a, c0e, s2, s6, sa, se, eo00, eo01        ); // 32 16  4
   mac4  mac49 (c0i, c0m, c0q, c0u, si, sm, sq, su, eo10, eo11        ); // 32 16 8 4
   mac4  mac4a (c04, c0c, c0k, c0s, s4, sc, sk, ss, eeo00, eeo01      ); // 32 16 8 4
   mac4x mac4b (c00, c0g, c08, c0o, s0, sg, s8, so, eee00, eee01, eee10, eee11); // 32 16 8 4

// {r180+r181}      a0
// {r190+r191}      a1
// {r1a0+r1a1}      a2
// {r1b0+r1b1}      a3

// {r200,r201}      d0x
// {r210,r211}      d1x
// {r220,r221}      d2x
// {r230,r231}      d3x add (r200, r201, d0);
   add (r210, r211, d1);
   add (r220, r221, d2);
   add (r230, r231, d3);

// d0            d0
// d1            d1
// d2            d2
// d3            d3
```

VIDEO CODING TRANSFORM SYSTEMS AND METHODS

RELATED APPLICATION DATA

This application claims the benefit of the filing date of U.S. Provisional Patent Application No. 61/834,037, filed Jun. 12, 2013, which is herein incorporated by reference.

BACKGROUND OF THE INVENTION

The invention relates to video data processing, an in particular to video encoding and decoding systems and methods including video transform computation units.

Video processing, be it video compression, video decompression, or image processing in general, makes use of large amounts of data which are typically organized in video frames (pictures). Video processing generally requires significant computational resources and memory bandwidth. The computational burden and associated memory bandwidth and power requirements of video processing can be particularly challenging in mobile, battery-operated devices, which are subject to stringent power consumption constraints. In particular, using higher clock frequencies to improve performance may lead to higher power consumption, which may be particularly undesirable in mobile devices. As video resolutions increase to 4 k and beyond, performing video processing, and particularly video decoding, in real time on mobile devices can pose new challenges.

SUMMARY OF THE INVENTION

According to one aspect, an integrated circuit comprises an 8-point video transform computation unit comprising a first set of multiply-accumulate (MAC) units configured to generate an 8-point transform of 8×8 video block data; a 16-point video transform computation unit remainder comprising a second set of MAC units connected to the first set of MAC units, wherein the first set of MAC units and the second set of MAC units are part of a 16-point video transform computation unit configured to generate a 16-point transform of 16×16 video block data; and a 32-point video transform computation unit remainder comprising a third set of MAC units connected to the second set of MAC units, wherein the first set of MAC units, the second MAC units, and the third set of MAC units are part of a 32-point video transform computation unit configured to generate a 32-point transform of 32×32 video block data.

According to another aspect, an integrated circuit comprises a plurality of multiply-accumulate (MAC) units; and a plurality of adders connected to the MAC units. The plurality of MAC units and plurality of adders are connected to form a 32-point video transform computation unit configured to configured to generate a 32-point transform of 32×32 video block data. The 32-point video transform computation unit comprises a 16-point video transform computation subsection configured to alternatively generate part of the 32-point transform and generate a 16-point transform of 16×16 video block data. The 16-point video transform computation subsection comprises an 8-point video transform computation subsection configured to alternatively generate part of the 32-point transform of 32×32 video block data, part of a 16-point transform of 16×16 video block data, and an 8-point transform of 8×8 video block data.

BRIEF DESCRIPTION OF THE DRAWINGS

The foregoing aspects and advantages of the present invention will become better understood upon reading the following detailed description and upon reference to the drawings where:

FIG. 2-A shows an exemplary video image decoder including a lossless 2D decoder according to some embodiments of the present invention.

FIG. 2-B shows an exemplary video image encoder including a lossless 2D decoder according to some embodiments of the present invention.

FIG. 4 shows a number of exemplary transform coefficients for a 32×32 video transform according to some embodiments of the present invention.

FIGS. 5-A-C each show part of exemplary code characterizing nested 32×32, 16×16, 8×8 and 4×4 video transforms according to some embodiments of the present invention.

FIG. 6 shows exemplary code characterizing a number of transform computational units according to some embodiments of the present invention.

FIGS. 7-A-B each show part of exemplary code characterizing a usage and schedule of computational units for a 32 point transform, according to some embodiments of the present invention.

FIG. 8-A shows a fused quad multiply accumulate (MAC) unit according to some embodiments of the present invention.

FIG. 8-B shows exemplary control logic and an associated multiplexer used to alter transform unit configurations in response to a determined block size according to some embodiments of the present invention.

FIG. 10 shows exemplary code characterizing a usage and schedule of computational units for a 16 point transform, according to some embodiments of the present invention.

FIG. 11-A shows the structure of an exemplary 16 point video transform computation unit and an 8 point subset according to some embodiments of the present invention.

FIG. 11-B shows the structure of an exemplary 16 point video transform computation unit and a 4 point subset according to some embodiments of the present invention.

FIG. 12 shows exemplary code characterizing a usage and schedule of computational units for an 8 point transform, according to some embodiments of the present invention.

FIG. 13 shows the structure of an exemplary 8 point video transform computation unit according to some embodiments of the present invention.

DETAILED DESCRIPTION OF THE INVENTION

The following description illustrates the present invention by way of example and not necessarily by way of limitation. Any reference to an element is understood to refer to at least one element. A set of elements is understood to include one or more elements. A plurality of elements includes at least two elements, and multiple elements refers to at least two elements. Unless otherwise specified, each recited element or structure can be formed by or be part of a single structure or unit, or be formed from multiple distinct structures or units. Unless otherwise specified, any recited connections can be direct connections or indirect operative connections established through intermediary circuit elements or structures. The statement that two or more events or actions happen synchronously is understood to mean that the events/actions happen on the same clock cycle. Unless otherwise specified, the term "access" is used below to encompass read and write transactions; in the context of a read transaction, accessing data refers to reading data, while in the context of a write transaction, accessing data refers to writing data. Unless otherwise specified, the term "coding" refers to encoding and/or decoding. Video data includes pixel-domain as well as frequency-domain video data (e.g. frequency-domain residual data). Unless otherwise specified, the term "transform" encompasses both forward and inverse transforms. Computer readable media encompass non-transitory (storage) media such as magnetic, optic, and semiconductor media (e.g. hard drives, optical disks, flash memory, DRAM), as well as communications links such as conductive cables and fiber optic links. According to some embodiments, the present invention provides, inter alia, computer systems including at least one processor and/or memory programmed to perform the methods described herein, as well as computer-readable media encoding instructions to perform the methods described herein.

Figure 1:
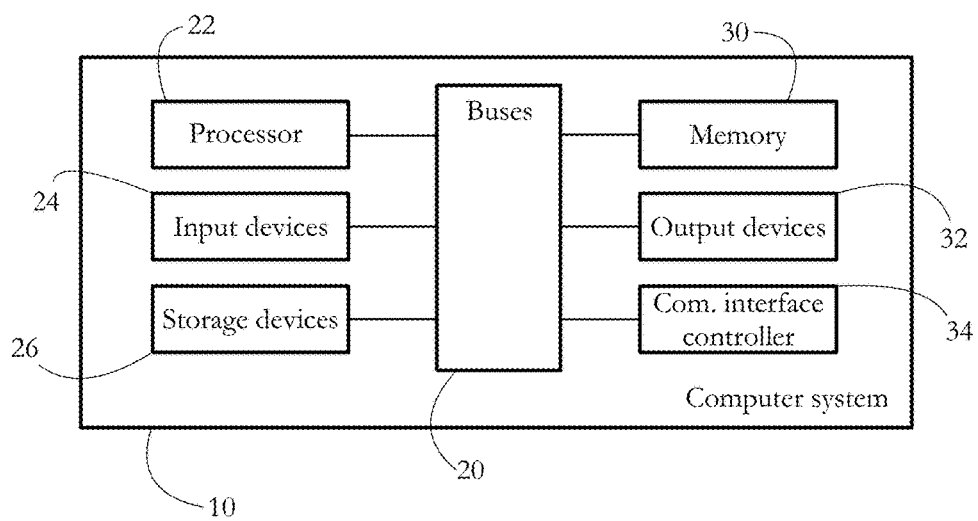
FIG. 1 shows an exemplary video coding (encoding and/or decoding) system including a video prediction cache, according to some embodiments of the present invention.

FIG. 1 shows an exemplary data processing system 10 according to some embodiments of the present invention. One or more buses 20 connect a microprocessor (CPU) 22, memory (e.g. DRAM) 30, input devices (e.g. mouse, keyboard) 24, output devices (e.g. display, speakers, haptic/vibration generator) 32, storage devices (e.g. hard drive, solid state drive) 26, and a communication interface controller (e.g. network interface card) 34. The illustrated computer system 10 may be a server, personal computer, tablet, or mobile communication device (e.g. smartphone) capable of performing video coding (encoding and/or decoding) operations.

Microprocessor 22 may be a general-purpose processor (e.g. a multi-core processor) integrated on a semiconductor substrate and running software implementing a number of system and/or method components as described below. In some embodiments, microprocessor 22 may include dedicated special-purpose hardware units (e.g. cores) implementing in hardware at least some of the system and/or method components described below. In particular, in some embodiments, hardware-implemented video encoders and/or decoders form part of microprocessor 22.

FIG. 2-A shows an exemplary video image decoder 36, while FIG. 2-B shows an exemplary video image encoder 136 according to some embodiments of the present invention. In some embodiments, at least some of the components shown in FIGS. 2-A and 2-B may be implemented using software running on a general-purpose processor, while at least some components, and in particular the video reorder buffer controllers described below, may be implemented as special-purpose hardware units.

As shown in FIG. 2-A, decoder 36 includes a number of decoder units connected between a video input and a corresponding bitstream output: an entropy decoder (CABAC) unit 40, an inverse quantization unit 44, an inverse transform unit 46, a motion vector unit 48, an intra prediction unit 50, a motion compensation unit 52, a prediction cache 54, a lossless 2D decoder unit 58, a frame storage unit 60, a lossless 2D encoder unit 62, and a loop filter unit 64. Decoder 36 receives a compressed standard-compliant bytestream and outputs pictures in raster order.

As shown in FIG. 2-B, encoder 136 includes a number of encoder units connected between a video input and bitstream output: a video statistics generation unit 140, an intra prediction unit 144, a motion estimation unit 146, a prediction cache 148, a lossless 2D decoder unit 58, a residual determination unit 152, a forward transform unit 154, a forward quantization unit 158, an inverse quantization unit 160, an inverse transform unit 162, a bits estimation unit 164, a rate-distortion optimization unit 166, a frame storage unit 168, a lossless 2D encoder unit 62, a loop filter unit 174, a triage station unit 176, and an entropy encoder (CABAC) unit 178. In some embodiments, frame storage units 60, 168 may be provided off-die, in external memory. In some embodiments, frame storage units 60, 168 are included on-die (on the same semiconductor substrate) with the other components shown in FIGS. 2-A-B. Encoder 136 receives picture data in raster order and outputs a compressed standard-compliant byte-stream.

Decoder 36 and/or encoder 136 perform video coding operations according to one or more video coding standards such as MPEG-2, H.264 (MPEG 4 AVC), and/or H.265 (HEVC, or High Efficiency Video Coding). Compared to H.264, HEVC may allow increased compression rates at the same level of quality, or alternatively provide improved video quality at the same bit rate, but generally requires increased computational and memory bandwidth resources.

Figure 3:
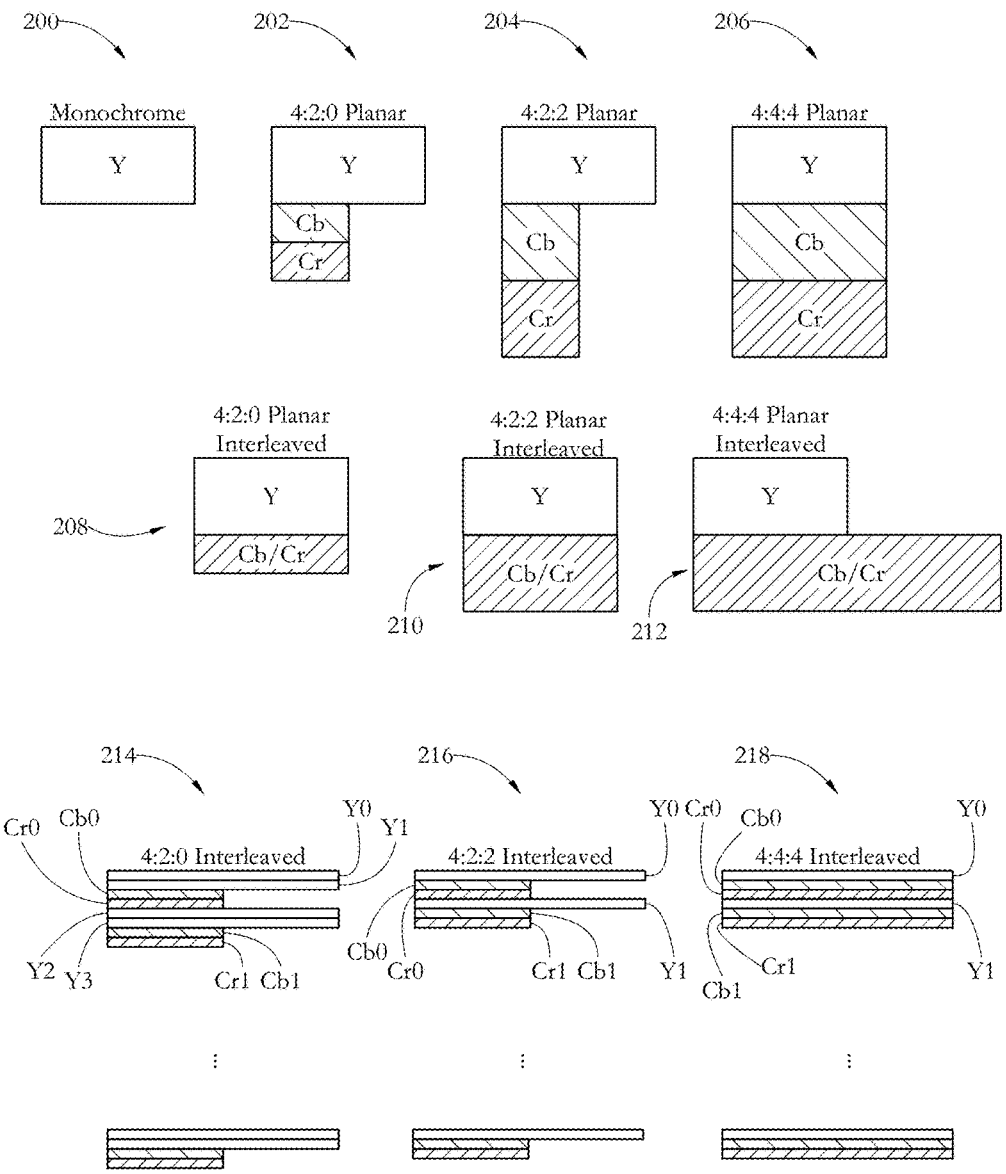
FIG. 3 shows a number of exemplary pixel sequences for different picture formats according to some embodiments of the present invention.

In some embodiments, decoder 36 and encoder 136 support multiple picture formats, including monochrome, 4:2:0, 4:2:2, and 4:4:4 chroma formats, planar, interleaved, and planar interleaved. FIG. 3 illustrates a number of exemplary pixel sequences: a monochrome sequence 200, a 4:2:0 planar sequence 202, a 4:2:2 planar sequence 204, a 4:4:4 planar sequence 406, a 4:2:0 planar interleaved sequence 208, a 4:2:2 planar interleaved sequence 210, a 4:4:4 planar interleaved sequence 212, a 4:2:0 interleaved sequence 214, a 4:2:2 interleaved sequence 216, and a 4:4:4 interleaved sequence 218. In FIG. 3, Y denotes luminance (luma), while Cb and Cr denote blue-difference and red-difference chrominance (chroma) components, respectively. In the planar interleaved sequences 208-212, Cb and Cr are interleaved at the byte level.

The HEVC (High Efficiency Video Coding, MPEG-H Part 2, H.265) standard makes use of 32×32, 16×16, 8×8, and 4×4 transforms to convert samples between the spatial and frequency domains. The transforms are separable, i.e. multiple one-dimensional 32, 16, 8, and 4 point transforms can be used to generate the corresponding two-dimensional transforms. As a convention, for the encoder, the transform is computed first horizontally, then vertically; for the decoder, first vertically, then horizontally.

Figure 4:
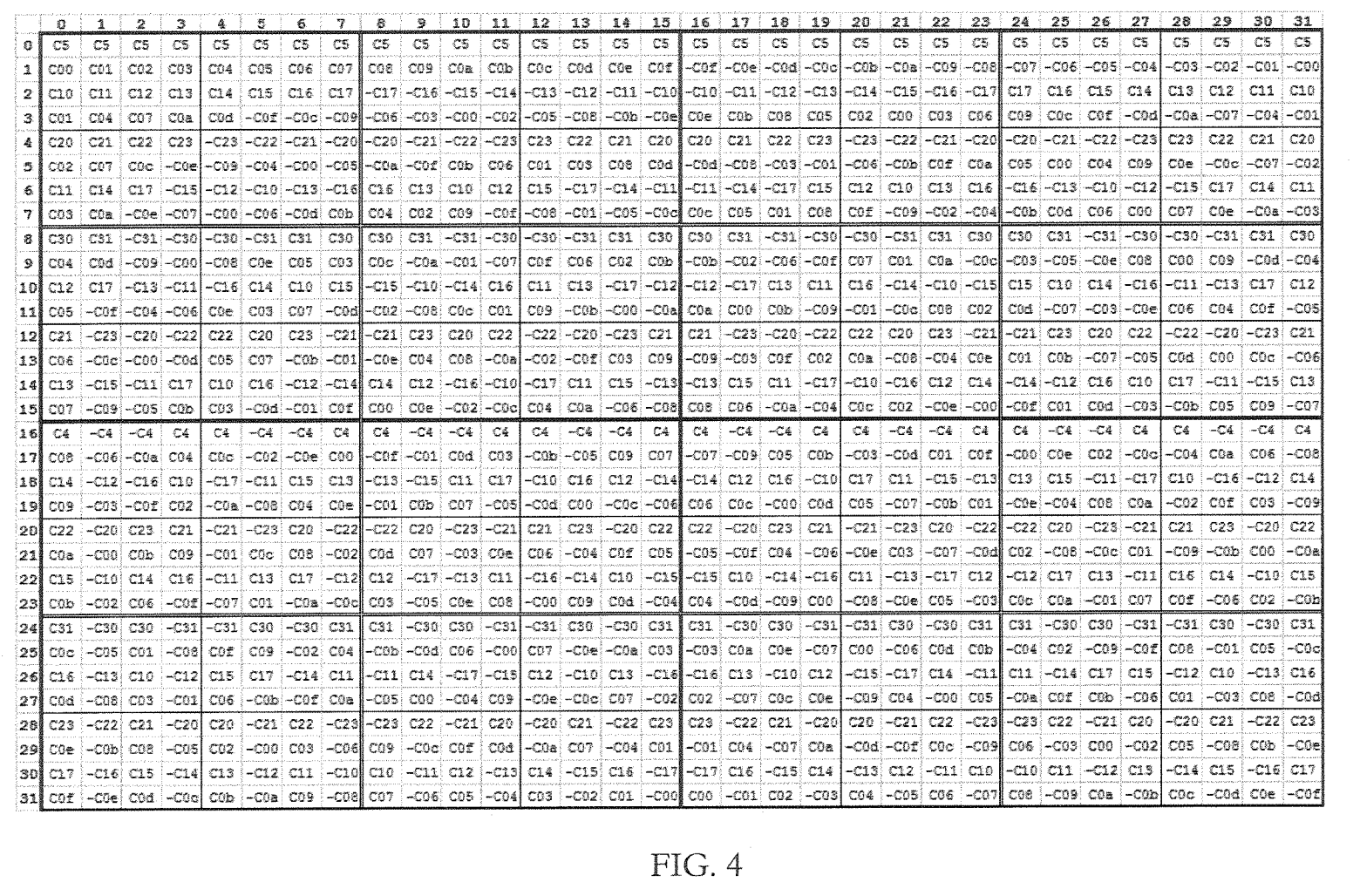

FIG. 4 shows a number of exemplary transform coefficients for a 32×32 HEVC video transform according to some embodiments of the present invention. The transform coefficients shown in FIG. 4 are defined by the HEVC standard. The coefficients are the same for forward and inverse transforms; for an inverse transform, the (frequency-domain) input data is input in reverse order relative to the (pixel-domain) input data of a forward transform. In some embodiments, for example for different standards, different coefficients may be used. Using the regular transform coefficient symmetries and antisymmetries, the 32×32=1024 coefficients can be reduced to the 32 coefficients shown in the first column of FIG. 4. The coefficient names shown in FIG. 4 include two or three characters. The first character is a 'C' for coefficient, as distinct from sample. The second character is a digit that indicates how many times the column 0 vertical coefficient position is a multiple of 2. In this way, the coefficients can be partitioned in 6 classes: odd coefficients that start with 'C0', odd multiples of 2 that start with 'C1', odd multiples of 4 that start with 'C2', odd multiples of 8 that start with 'C3', odd multiples of 16 that start with 'C4', and even multiples of 4 that start with 'C5'. The third character is used only if there is more than one coefficient in the class. As described below, coefficient class C0 is used only by the 32 point transform, C1 by the 32 and 16 point transforms, C2 by the 32, 16, and 8, and C3, C4, and C5 by all transforms.

Calculating a video transform can be computationally intensive, particularly for larger transform sizes. Table 1 shows exemplary numbers of multiplication and addition operations involved in a full matrix multiplication and a calculation using the known Chen algorithm for one-dimensional transforms of different sizes up to 32:

TABLE 1

Multiplies and Adds for the 4, 8, 16, and 32 point one dimensional transforms

| Transform Size | Matrix multiplication | | | | Chen algorithm | | | |
|---|---|---|---|---|---|---|---|---|
| | Multiplies | Adds | Multiplies/ sample | Adds/ sample | | | Multiplies/ sample | Adds/ sample |
| 4 | 16 | 12 | 4.0 | 3.0 | 6 | 8 | 1.5 | 2.0 |
| 8 | 64 | 56 | 8.0 | 7.0 | 22 | 28 | 2.8 | 3.5 |
| 16 | 256 | 240 | 16.0 | 15.0 | 86 | 100 | 5.4 | 6.3 |
| 32 | 1024 | 992 | 32.0 | 31.0 | 342 | 372 | 10.7 | 11.6 |

Performing such numbers of computations requires hardware of commensurate complexity. In particular, the amount of hardware required increases with the transform size and with the number of different transform sizes supported by the system. Exemplary systems and methods as described below allow reducing the amount of logic (hardware) required to implement multiple transform sizes, by allowing the reuse of smaller-transform hardware in the computation of larger transforms. Hardware is effectively nested, with 4-point transform hardware forming part of 8-point transform hardware, which in turn forms part of 16-point transform hardware, which in turn forms part of 32-point transform hardware. For clarity, the description below will show examples of both code characterizing the operations performed by various transforms, and corresponding hardware used to implement the operations.

In particular, the description below focuses on a relatively compact transform unit implementation using twelve 8×16-bit fused quad MAC units and 19 adders that can compute a 32 point transform in 8 cycles, a 16 point transform in 4 cycles, an 8 point transform in 2 cycles and a 4 point transform in 1 cycle, all with a latency of 3 cycles corresponding to three computational stages (delineated by two register stages shown in FIG. 9). In exemplary embodiments, the 32×32 transform takes 32*8=256 cycles, the 16×16 transform takes 16*4=64 cycles, the 8×8 transform takes 8*2=16 cycles, and the 4×4 transform takes 4*1=4 cycles. In such a system, the transform of any 32×32 block takes 256 cycles, no matter how the 32×32 block is partitioned in 32×32, 16×16, 8×8, and 4×4 transforms. The ability to compute a 32×32 transform in constant time regardless of the transform partitioning is particularly useful in a pipeline implementation.

FIGS. 5-A-C each show part of exemplary code characterizing nested 32-point, 16-point, 8-point and 4-point video transforms according to some embodiments of the present invention. The code of FIGS. 5-A-C should be read together; three separate figures are used due to page/text size limitations. FIG. 5-B shows an inner 4 point transform loop 300, which is nested within the 8-point transform loop, which is in turn nested within the 16-point transform loop (shown in FIGS. 5-A and 5-B), which is in turn nested within the 32-point transform loop (shown in FIGS. 5-A and 5-C). The innermost section 300 is used by all transforms, the next section by all except the 4 point transform, the next by the 32 and 16 point transform, and the outermost only by the 32 point transform. In FIG. 5-A-C, the transform coefficients use three character names, the first being always 'c', followed by the matrix row and column index expressed as base 32 digits. The samples use two characters names, the first being always 's', followed by the index expressed as a base 32 digit. The letter "e" refers to even, "o" refers to odd, and multiple instances of "e" refer to how many times the variable is even (the power of two that is a factor of the variable).

FIG. 6 shows exemplary code characterizing a number of transform computational units according to some embodiments of the present invention. The variables mac4 and mac4x represent operations performed by 8×16-bit fused quad MAC units. In some embodiments, each MAC unit uses a Wallace tree with a modified Booth recoding algorithm. A Wallace tree is a known hardware implementation of a digital circuit that multiplies two integers. The modified Booth multiplication algorithm is a known multiplication algorithm that multiplies two binary numbers. For 8-bit coefficients, there are 16 entries in the corresponding Wallace tree, which may be implemented using 6 Carry Save Adders (CSA) as described below. The output may be kept in redundant binary format, which allows fitting the entire MAC operation in one cycle. The operations performed to determine mac4 and mac4x differ in that mac4x also provides a multiply-subtract output used by the 8 point transform. The operations represented by the variables add2 and sub2 add/subtract two numbers in redundant binary format. A redundant binary representation uses more bits than needed to represent a single binary digit, so that numbers may have several representations. Employing a binary redundant format allows performing addition operations without a carry, and consequently without incurring a delay that would be caused by propagating a carry through an addition unit. The output may also be kept in redundant binary format, and each of the operations may be implemented with two CSAs as described below. Finally, the operation represented by the variable add may be implemented using a regular carry-propagate adder.

Figure 7:
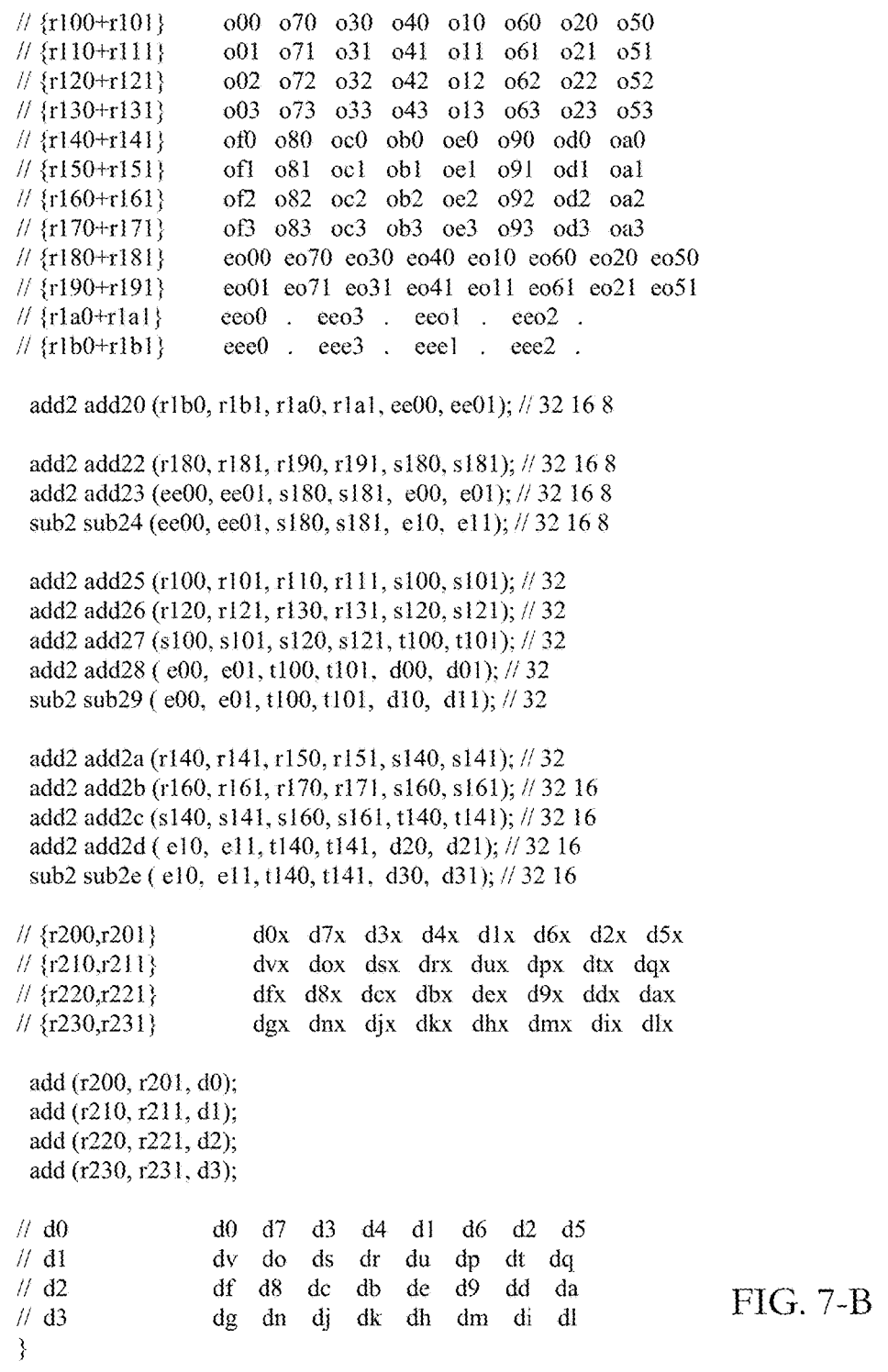

FIGS. 7-A-B each show part of exemplary code characterizing a usage and schedule of computational units for a 32 point transform, according to some embodiments of the present invention. The notation "r" refers to registers, as described below. The illustrated transform unit is implemented as a three stage pipeline. The mac4 and mac4x units (see FIGS. 6 and 7-A) operate in the first pipestage, the add2 and sub2 units (see FIGS. 6 and 7-B) in the second, and the add unit (see FIGS. 6 and 7-B) in the third. The add units are the only units that propagate the carry.

In some embodiments, the computations described above are implemented using a plurality of fused quad multiply accumulate (MAC) units. FIG. 8 shows a fused quad multiply-accumulate (MAC) unit 400 suitable for operating on 8-bit coefficients and 16-bit samples according to some embodiments of the present invention. A fused MAC performs a multiply-add operation in one step, with a single Wallace tree and a single rounding. In some embodiments, single, dual, octal and/or other MAC units may be used. Also, unfused MAC units may be used instead of or in addition to fused MAC units.

FIG. 8-B shows exemplary control logic 410 and an associated multiplexer 412 used to alter transform unit configurations in response to a determined block size according to some embodiments of the present invention. Control logic 410 receives an indicator of a current block size for a video block to be processed, and selects an output of multiplexer 412 according to the block size. Under the control of control logic 410, multiplexer 412 accordingly selects between alternative connections between MAC units and/or associated registers to generate alternative transform unit configurations as described below.

Figure 9:
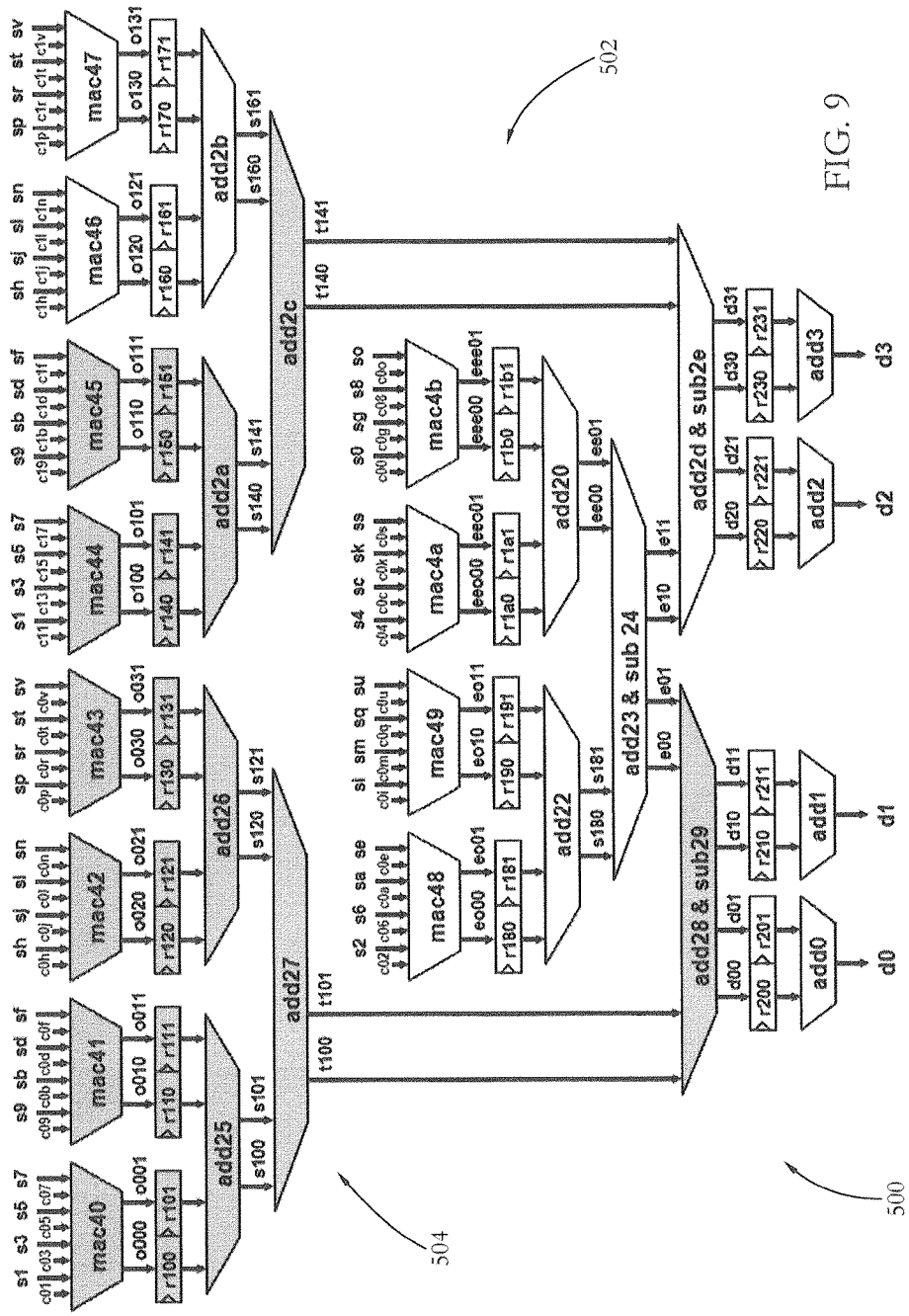
FIG. 9 shows the structure of an exemplary 32 point video transform computation unit and a 16 point subset according to some embodiments of the present invention.

FIG. 9 shows the structure of an exemplary 32-point video transform computation unit 500 and a 16 point subset 502 according to some embodiments of the present invention. The structure of FIG. 9 may be used to implement the exemplary code shown in FIGS. 7-A-B. The 32-point transform computation unit 500 comprises 16-point subset 502, which is used for 16 point computations, and a 32 point remainder 504, shown in grey in FIG. 9, which is used for 32 point computations but not 16 point computations. The twelve register pairs r100 to r1b1 store the outputs of the twelve fused quad MACs from the first pipestage (mac40 to mac4b) in redundant binary format, and the four register pairs r200 to r231 store the outputs of the second stage adders and subtractors add25 to add2d&sub2e, also in redundant binary format. The outputs of the the four register pairs r200 to r231 are connected to the four adders add0 to add3 of the third stage. For the 16-point transform, the 32 point remainder 504 (the gray blocks in FIG. 9) is not used as that section implements the first outer section of the code of FIGS. 5-A-C. The 16-point transform uses the mac46 and mac47 units, as the 16-point transform needs to be computed in 4 cycles, not 8.

FIG. 10 shows exemplary code characterizing a usage and schedule of computational units for a 16 point transform, according to some embodiments of the present invention, while FIGS. 11-A-B show exemplary hardware suitable for implementing the code of FIG. 10. As shown in FIG. 10, the 16-point transform uses only the even samples and coefficients of the 32-point transform.

FIG. 11-A shows the structure of an exemplary 16 point video transform computation unit 510, an 8 point subset 512 used for 8 point computations, and a 16 point remainder 514, shown in grey in FIG. 11-A, which is used for 16 point computations but not 8 point computations, according to some embodiments of the present invention. The 16 point remainder 514 implements the second outer section shown in FIG. 5-A, and is not used for 8 point computations. The mac47 unit is used, as the 8-point transform is computed in 2 cycles, not 4. Relative to the configuration shown in FIG. 9, the outputs of the add23 & sub24 units are connected to the inputs of the r200, r201, r210, r211 registers, and the sub21 and add2b outputs are connected to the inputs of add2d & add2e with the help a few multiplexers (FIG. 8-B).

FIG. 11-B shows the structure of 16 point video transform computation unit 510, a 4 point subset 516 used for 4 point computations, and a 16 point remainder 518, shown in grey in FIG. 11-B, which is used for 16 point computations but not 4 point computations, according to some embodiments of the present invention. The 4-point transform is implemented as full matrix multiplication because the alternate transform used for intra 4×4 luma does not have the same symmetries as the regular transform. Using a full matrix multiplication does not increase the overhead as the 4-point matrix multiplication uses 16 MACs provided by 4 fused MAC units mac48, mac49, mac4a, mac4b. The 16 point remainder 518 implements the outer section shown in FIG. 5-B (third outer section in the combined code of FIGS. 5-A-C), and is not used in the 4-point calculations. The 4-point transform is computed in one cycle.

FIG. 12 shows exemplary code characterizing a usage and schedule of computational units for an 8-point transform, according to some embodiments of the present invention. FIG. 13 shows the structure of an exemplary 8 point video transform computation unit suitable for implementing the code of FIG. 12 according to some embodiments of the present invention. The 8-point transform uses only the multiple of 4 samples and coefficients of the 32-point transform. Relative to the structure shown in FIG. 11-A, the outputs of add20 & sub21 units are connected to the inputs of the r200, r201, r210, r211 registers, the eee10 and eee11 outputs of the mac4b unit to the inputs of r160 and r161, and the r170 and r171 outputs to the inputs of add2d & add2e with the help of a few multiplexers (FIG. 8-B).

Figures 14, 15:
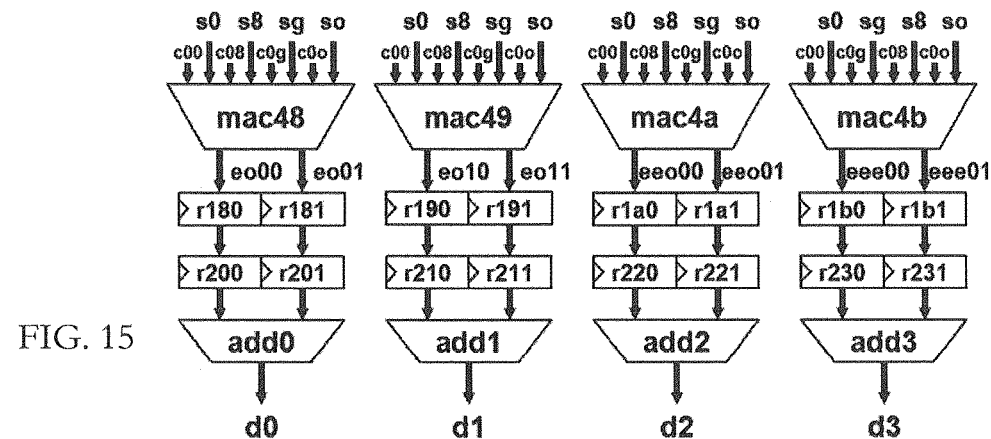
FIG. 14 shows exemplary code characterizing a usage and schedule of computational units for a 4 point transform, according to some embodiments of the present invention.
FIG. 15 shows the structure of an exemplary 4 point video transform computation unit according to some embodiments of the present invention.

FIG. 14 shows exemplary code characterizing a usage and schedule of computational units for a 4 point transform, according to some embodiments of the present invention. FIG. 15 shows the structure of an exemplary 4 point video transform computation unit suitable for implementing the code FIG. 14 according to some embodiments of the present invention. The 4-point transform uses only the multiple of 8 samples and coefficients of the 32-point transform. Relative to the configuration illustrated in FIG. 11-B, the outputs of the r180, r181, r190, r191 registers are connected to the inputs of the r200, r201, r210, r211 registers, and the r1a0, r1a1, r1b0, r1b1 outputs to the inputs of r220, r221, r230, r231 with the help of a few multiplexers (FIG. 8-B). Although the 4-point transform could be computed in two cycles, in some embodiments three cycles are used so all transforms have the same latency. The extra cycle is added through the use of a second, redundant stage of registers r200, r201, r210, r211.

Figure 16:
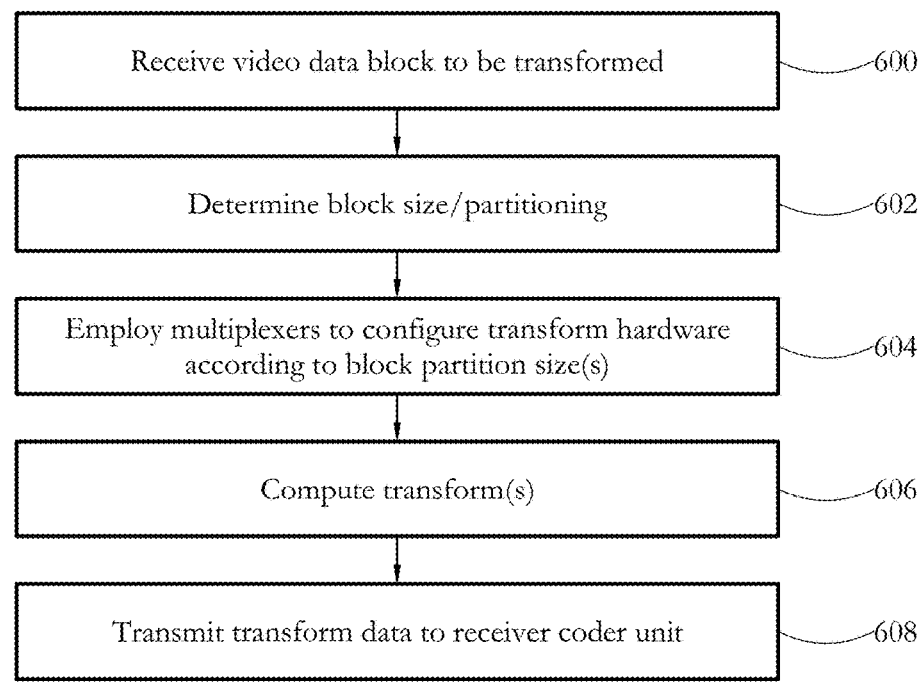
FIG. 16 is a flowchart illustrating a sequence of steps performed according to some embodiments of the present invention.

FIG. 16 is a flowchart illustrating a sequence of steps performed to perform transform calculations according to some embodiments of the present invention. In a step 600, a transform computation unit receives from a preceding video encoder/decoder processing unit (see FIGS. 2-A-B) a video data block whose transform is to be computed. In a step 602, the block size and/or partitioning is determined according to metadata associated with the block. In a step 604, one or more multiplexers are employed to configure the transform hardware according to the determined block size as described above. In a step 606, the block transform is computed as described above. In a step 608, the resulting transform data is sent to a subsequent encoder/decoder processing unit (see FIGS. 2-A-B) which uses the transform data in further processing.

The exemplary systems and methods described above allow reducing the hardware (logic) footprint required to implement a video transform unit that is both efficient and allows computing transforms for different video block sizes. A relatively compact transform design is particularly useful for HEVC systems, which employ relatively large block sizes. In some embodiments, the transform unit can compute the transform of a 32×32 block in a constant number of clock cycles, regardless of the way the 32×32 block is partitioned (if at all) in smaller blocks before input to the transform unit, a feature that facilitates pipelined operation of the encoder/decoder without stalls. Implementing operations in redundant binary format allows propagating carries only in the final transform stage, allowing relatively fast operation of the transform unit. In some embodiments, an exemplary transform unit as described above is capable of performing 12 multiplications per cycle for 1 coefficient per cycle throughput (1024 cycles for a 32×32 block assuming no stall cycles), 24 multiplications per cycle for 2 coefficient per cycle throughput (512 cycles for a 32×32 block), 48 multiplications per cycle for 4 coefficient per cycle throughput (256 cycles for a 32×32 block—preferred), 96 multiplications per cycle for 8 coefficient per cycle throughput (128 cycles for a 32×32 block), etc.

The above embodiments may be altered in many ways without departing from the scope of the invention. Accordingly, the scope of the invention should be determined by the following claims and their legal equivalents.

What is claimed is:

1. An integrated circuit comprising:
a circuit configured to:
receive video data that includes a plurality of binary digits, wherein a particular binary digit is represented using a plurality of data bits, wherein one or more of data bits of the plurality of data bits encode redundancy information;
determine a block size associated with the video data; and
generate a plurality of multiplex selection signals;
an 8-point video transform computation unit comprising a first set of multiply-accumulate (MAC) units configured to generate an 8-point transform of 8×8 video block data;
a 16-point video transform computation unit remainder comprising a second set of MAC units connected to the first set of MAC units, wherein the first set of MAC units and the second set of MAC units are part of a 16-point video transform computation unit configured to generate a 16-point transform of 16×16 video block data;
a 32-point video transform computation unit remainder comprising a third set of MAC units connected to the second set of MAC units, wherein the first set of MAC units, the second MAC units, and the third set of MAC units are part of a 32-point video transform computation unit configured to generate a 32-point transform of 32×32 video block data;
wherein a particular MAC unit of the first set, second set, or third set of MAC units includes a Wallace tree circuit configured to perform a multiply-add operation using a single cycle; and
a plurality of multiplex circuits configured to selectively couple one or more of the first set of MAC units, the second set of MAC units, and the third set of MAC units using the plurality of multiplex selection signals.

2. The integrated circuit of claim 1, wherein the 32-point video transform computation unit forms part of a hardware video encoder.

3. The integrated circuit of claim 1, wherein the 32-point video transform computation unit forms part of a hardware video decoder.

4. The integrated circuit of claim 1, wherein at least one MAC unit selected from the first set of MAC units, the second set of MAC units, and the third set of MAC units is a fused quad MAC unit.

5. The integrated circuit of claim 4, wherein the first set of MAC units, the second set of MAC units, and the third set of MAC units are fused quad MAC units.

6. The integrated circuit of claim 1, wherein the integrated circuit is configured to generate a transform of video data of a 32×32 video data block in a number of cycles that is independent of the partitioning of the 32×32 video data block in smaller block sizes, each size processed by a different video transform computation unit of the integrated circuit.

7. The integrated circuit of claim 1, comprising a vertical instantiation of the 32-point video transform computation unit remainder configured to process vertical video data, and a horizontal instantiation of the 32-point video transform computation unit remainder configured to process horizontal video data.

8. An integrated circuit comprising:
a circuit configured to:
receive video data that includes a plurality of binary digits, wherein a particular binary digit is represented using a plurality of data bits, wherein one or more data bits of the plurality of data bits encodes redundancy information;
determine a block size associated with the video data; and
generate a plurality of multiplex selection signals;
a plurality of multiply-accumulate (MAC) units; and
a plurality of adders connected to the MAC units;
wherein the plurality of MAC units and plurality of adders are connected to form a 32-point video transform computation unit configured to configured to generate a 32-point transform of 32×32 video block data;
wherein the 32-point video transform computation unit comprises a 16-point video transform computation subsection configured to alternatively generate part of the 32-point transform and generate a 16-point transform of 16×16 video block data;
wherein the 16-point video transform computation subsection comprises an 8-point video transform computation subsection configured to alternatively generate part of the 32-point transform of 32×32 video block data, part of a 16-point transform of 16×16 video block data, and an 8-point transform of 8×8 video block data;

wherein a particular MAC unit of the first set, second set, or third set of MAC units includes a Wallace tree circuit configured to perform a multiply-add operation using a single cycle; and a multiplex circuit configured to control at least one interconnection between MAC units of different video transform computation units according to a size of an input video data block using the plurality of multiplex selection signals.

9. The integrated circuit of claim 8, wherein the 32-point video transform computation unit forms part of a hardware video encoder.

10. The integrated circuit of claim 8, wherein the 32-point video transform computation unit forms part of a hardware video decoder.

11. The integrated circuit of claim 8, wherein at least one of the plurality of MAC units is a fused quad MC unit.

12. The integrated circuit of claim 11, wherein the plurality of MAC units are fused quad MAC units.

13. The integrated circuit of claim 8, wherein the integrated circuit is configured to generate a transform of video data of a 32×32 video data block in a number of cycles that is independent of the partitioning of the 32×32 video data block in smaller block sizes, each size processed by a different video transform computation unit of the integrated circuit.

14. The integrated circuit of claim 8, comprising a vertical instantiation of the 32-point video transform computation unit remainder configured to process vertical video data, and a horizontal instantiation of the 32-point video transform computation unit remainder configured to process horizontal video data.

* * * * *